(12) United States Patent
Tamatam et al.

(10) Patent No.: US 10,748,235 B2
(45) Date of Patent: Aug. 18, 2020

(54) METHOD AND SYSTEM FOR DIM LAYER POWER OPTIMIZATION IN DISPLAY PROCESSING

(71) Applicant: QUALCOMM Incorporated, San Diego, CA (US)

(72) Inventors: Raviteja Tamatam, Hyderabad (IN); Jayant Shekhar, Hyderabad (IN); Kalyan Thota, Hyderabad (IN); Venkata Nagarjuna Sravan Kumar Deepala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/058,164

(22) Filed: Aug. 8, 2018

(65) Prior Publication Data

US 2020/0051202 A1 Feb. 13, 2020

(51) Int. Cl.
*G06T 1/20* (2006.01)
*G06T 1/60* (2006.01)
*G06T 3/40* (2006.01)

(52) U.S. Cl.
CPC .................. *G06T 1/20* (2013.01); *G06T 1/60* (2013.01); *G06T 3/4092* (2013.01); *G06T 2200/16* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 5,706,417 A | * | 1/1998 | Adelson | G06T 9/00 345/474 |
| 6,466,210 B1 | * | 10/2002 | Carlsen | G06T 11/60 345/629 |
| 2002/0145615 A1 | * | 10/2002 | Moore | G06T 15/503 345/629 |
| 2004/0217947 A1 | * | 11/2004 | Fitzmaurice | G06F 3/0481 345/183 |
| 2010/0171759 A1 | * | 7/2010 | Nickolov | G06T 3/40 345/634 |
| 2010/0290704 A1 | * | 11/2010 | Christiansen | G06T 9/00 382/173 |
| 2017/0278482 A1 | * | 9/2017 | Purushothaman | G09G 5/022 |
| 2019/0079639 A1 | * | 3/2019 | Lindberg | G06F 3/0481 |
| 2019/0149792 A1 | * | 5/2019 | Luo | G06F 3/14 |

* cited by examiner

*Primary Examiner* — Jason A Pringle-Parker
(74) *Attorney, Agent, or Firm* — QUALCOMM Incorporated

(57) ABSTRACT

Techniques are provided for optimizing display processing of layers below a dim layer by a display system. Because the dim layer may partially obstruct, conceal, or otherwise impact a user view of layers below the dim layer, resource-saving techniques may be used in the processing the layers below the dim layer. While these techniques may impact visual quality, a user is unlikely to notice visual artifacts or other reductions in quality in the modified layers below the dim layer. For example, when a dim layer is to be displayed, a GPU can render layers below the dim layer at a lower resolution. Furthermore, the GPU can increase a compression ratio for layers below the dim layer. The low-resolution layers can be scaled-up to an original resolution and the compressed layers can be uncompressed in the display pipeline for display underneath the dim layer.

27 Claims, 11 Drawing Sheets

| type \| handle \| hint \| flag \| tr\| blnd \| format \| source crop (l,t,r,b) \| frame name |
|---|

Letter box (Landscape) — 152

- HWC | 7f8dc33d10 | 0002 | 0000 | 07 | 0100 | ? 7fa30c06 | 0.0, 0.0, 1120.0, 480.0 | 171, 0, 1268, 2560 | SurfaceView - org.codeaurora.gallery/com.android.gallery3d.app.MovieActivity
- HWC | 7f8dc33d80 | 0002 | 0000 | 00 | 0105 | RGBA_8888 | 0.0, 0.0, 1440.0, 2560.0 | 0, 0, 1440, 2560|org.codeaurora.gallery/com.android.gallery3d.app.MovieActivity

Pillar box (Landscape) — 154

- HWC | 7f8d62e0e0 | 0002 | 0000 | 07 | 0100 | ? 7fa30c06 | 0.0, 0.0, 320.0, 240.0 | 0, 320, 1440, 2240 | SurfaceView - org.codeaurora.gallery/com.android.gallery3d.app.MovieActivity
- HWC | 7f8d62e620 | 0002 | 0000 | 00 | 0105 | RGBA_8888 | 0.0, 0.0, 1440.0, 2560.0 | 0, 0, 1440, 2560|org.codeaurora.gallery/com.android.gallery3d.app.MovieActivity

Letter box (Portrait) — 156

- HWC | 7f8dc33140 | 0002 | 0000 | 00 | 0100 | ? 7fa30c06 | 0.0, 0.0, 1120.0, 480.0 | 971, 1440, 1588 | SurfaceView - org.codeaurora.gallery/com.android.gallery3d.app.MovieActivity
- HWC | 7f8d62e770 | 0002 | 0000 | 00 | 0105 | RGBA_8888 | 0.0, 0.0, 1440.0, 2560.0 | 0, 0, 1440, 2560|org.codeaurora.gallery/com.android.gallery3d.app.MovieActivity

FIG. 5

METHOD AND SYSTEM FOR DIM LAYER POWER OPTIMIZATION IN DISPLAY PROCESSING

TECHNICAL FIELD

The disclosure relates to display processing.

BACKGROUND

A display pipeline may allow applications to generate layers rendered by a GPU for display to a user. Rendering multiple high-resolution layers may be taxing on the display pipeline, including the GPU and memory resources. In some use cases, one or more layers to be displayed may be dim.

SUMMARY

In one embodiment of the invention, an apparatus for displaying data is discussed. The apparatus may include a memory, the memory storing a plurality of layers to be rendered for display. The apparatus may include a GPU in communication with the memory. The GPU may be configured to retrieve the plurality of layers to be rendered. The GPU may be configured to detect a dim layer among the plurality of layers. The GPU may be configured to render a first layer, the first layer being disposed above the dim layer. The GPU may be configured to render a second layer, the second layer being disposed below the dim layer, the second layer being rendered differently than the first layer in at least one of a resolution or compression ratio. The apparatus may include a display pipeline in communication with the GPU, the display pipeline configured to upconvert or decompress the second layer before display. Detecting the dim layer may be based on a comparison of an alpha value of the dim layer and a first opaqueness threshold. The first layer may be rendered at a first resolution and the second layer is rendered at a second resolution, wherein the second resolution lower than the first resolution. The second resolution may be decreased if the dim layer alpha value exceeds a second opaqueness threshold, wherein the second opaqueness threshold is higher than the first opaqueness threshold. The first layer may be rendered at a first compression ratio and the second layer is rendered at a second compression ratio, wherein the second compression ratio is higher than the first compression ratio. The second compression ratio may be increased if the dim layer alpha value exceeds a second opaqueness threshold, wherein the second opaqueness threshold is higher than the first opaqueness threshold. The resolution or compression ratio of the second layer may be selected in view of a power consumption or memory bandwidth constraint. The display pipeline may composite the rendered first layer, the dim layer, and the second layer for display.

In another embodiment of the invention, an apparatus for displaying data is discussed. The apparatus may include a memory means, the memory means storing a plurality of layers to be rendered for display. The apparatus may include a GPU means in communication with the memory. The GPU means may be configured to retrieve the plurality of layers to be rendered. The GPU means may be configured to detect a dim layer among the plurality of layers. The GPU means may be configured to render a first layer, the first layer being disposed above the dim layer. The GPU means may be configured to render a second layer, the second layer being disposed below the dim layer, the second layer being rendered differently than the first layer in at least one of a resolution or compression ratio. The apparatus may include a display pipeline means in communication with the GPU means, the display pipeline means configured to upconvert or decompress the second layer before display. Detecting the dim layer may be based on a comparison of an alpha value of the dim layer and a first opaqueness threshold. The first layer may be rendered at a first resolution and the second layer is rendered at a second resolution, wherein the second resolution lower than the first resolution. The second resolution may be decreased if the dim layer alpha value exceeds a second opaqueness threshold, wherein the second opaqueness threshold is higher than the first opaqueness threshold. The first layer may be rendered at a first compression ratio and the second layer is rendered at a second compression ratio, wherein the second compression ratio is higher than the first compression ratio. The second compression ratio may be increased if the dim layer alpha value exceeds a second opaqueness threshold, wherein the second opaqueness threshold is higher than the first opaqueness threshold. The resolution or compression ratio of the second layer may be selected in view of a power consumption or memory bandwidth constraint. The display pipeline means may composite the rendered first layer, the dim layer, and the second layer for display.

In another embodiment of the invention, a method for displaying data is discussed. The method may include retrieving a plurality of layers from a memory to be rendered. The method may include detecting a dim layer among the plurality of layers. The method may include rendering a first layer, the first layer being disposed above the dim layer. The method may include rendering a second layer, the second layer being disposed below the dim layer, the second layer being rendered differently than the first layer in at least one of a resolution or compression ratio. The method may include upconverting or decompressing the second layer before display. The method may include detecting the dim layer is based on a comparison of an alpha value of the dim layer and a first opaqueness threshold. The method may include the first layer is rendered at a first resolution and the second layer is rendered at a second resolution, wherein the second resolution lower than the first resolution. The method may include the second resolution is decreased if the dim layer alpha value exceeds a second opaqueness threshold, wherein the second opaqueness threshold is higher than the first opaqueness threshold. The method may include the first layer is rendered at a first compression ratio and the second layer is rendered at a second compression ratio, wherein the second compression ratio is higher than the first compression ratio. The method may include the second compression ratio is increased if the dim layer alpha value exceeds a second opaqueness threshold, wherein the second opaqueness threshold is higher than the first opaqueness threshold. The method may include the resolution or compression ratio of the second layer is selected in view of a power consumption or memory bandwidth constraint. The method may include the rendered first layer, the dim layer, and the second layer are composited for display.

In another embodiment of the invention, a non-transitory computer-readable storage medium storing instructions may be discussed. The instructions, when executed, may cause one or more processors of a device for processing data to retrieve a plurality of layers from a memory to be rendered, detect a dim layer among the plurality of layers, render a first layer, the first layer being disposed above the dim layer, render a second layer, the second layer being disposed below the dim layer, the second layer being rendered differently than the first layer in at least one of a resolution or compression ratio, and upconvert or decompress the second layer before display. Detecting the dim layer may be based on a comparison of an alpha value of the dim layer and a first opaqueness threshold. The first layer may be rendered at a first resolution and the second layer is rendered at a second resolution, wherein the second resolution lower than the first resolution. The second resolution may be decreased if the dim layer alpha value exceeds a second opaqueness threshold, wherein the second opaqueness threshold is higher than the first opaqueness threshold. The first layer may be rendered at a first compression ratio and the second layer is rendered at a second compression ratio, wherein the second compression ratio is higher than the first compression ratio. The second compression ratio may be increased if the dim layer alpha value exceeds a second opaqueness threshold, wherein the second opaqueness threshold is higher than the first opaqueness threshold.

The details of one or more examples are set forth in the accompanying drawings and the description below. Other features, objects, and advantages will be apparent from the description, drawings, and claims.

BRIEF DESCRIPTION OF DRAWINGS

FIG. 5 is a table illustrating layer details in an exemplary implementation of the present techniques.

DETAILED DESCRIPTION

This disclosure describes example techniques for optimizing display processing of layers below a dim layer by a display system. Because the dim layer may partially obstruct, conceal, or otherwise impact a user view of layers below the dim layer, resource-saving techniques may be used in processing the layers below the dim layer. While these techniques may reduce visual quality, a user is unlikely to notice visual artifacts or other quality reductions in the modified layers below the dim layer. For example, when a dim layer is displayed, a GPU can render layers below the dim layer at a lower resolution. Additionally or alternatively, the GPU can increase a compression ratio for layers below the dim layer. The display pipeline may scale up the low-resolution layers to an original resolution and decompress the compressed layers can be uncompressed for display underneath the dim layer.

Figure 1:
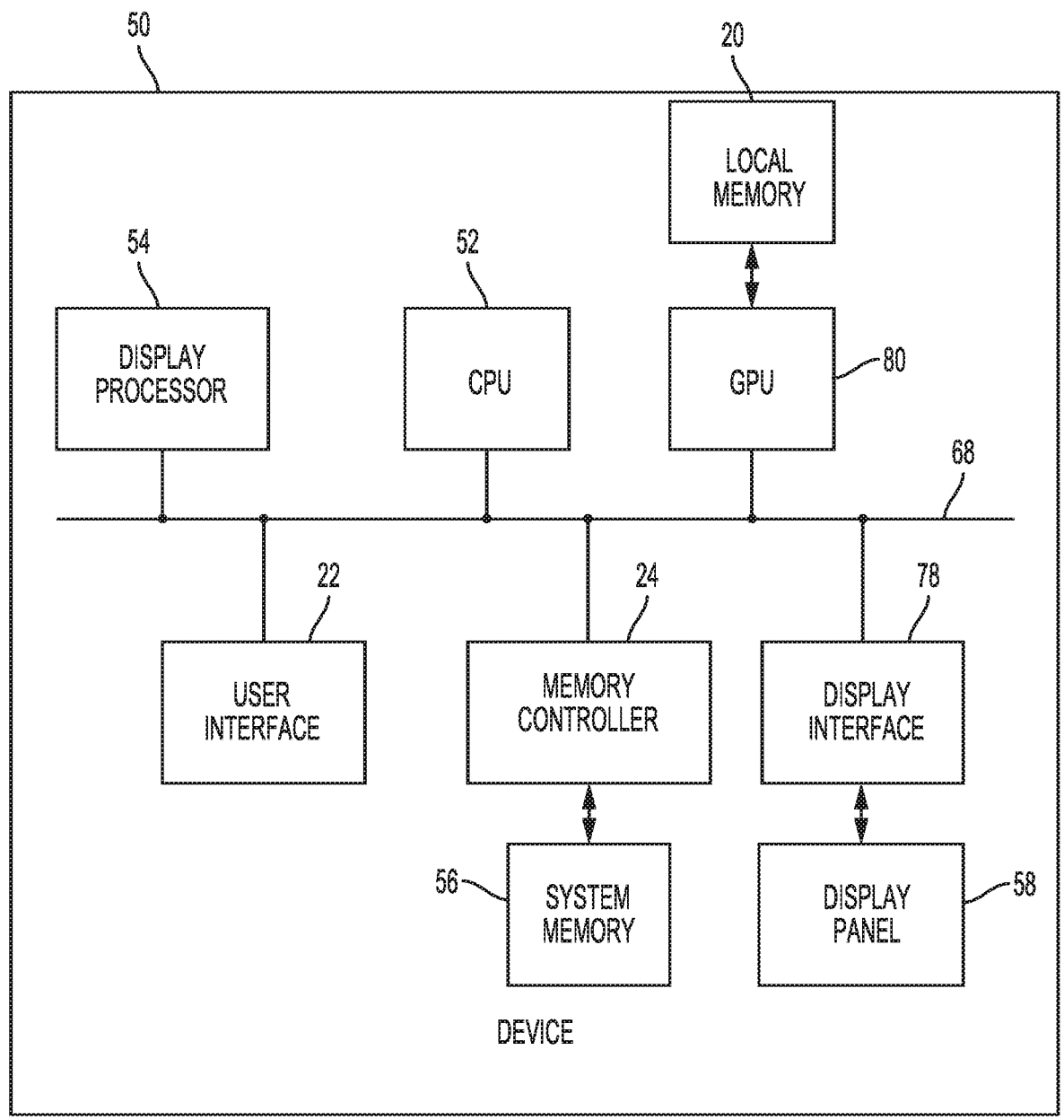
FIG. 1 is a block diagram illustrating an example computing device that may be configured to implement one or more examples of this disclosure.

FIG. 1 is a block diagram of a device configured to perform one or more of the example techniques described in this disclosure. Device 50 may be a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone for teleconferencing, an Internet telephone, a handheld device such as a portable video game device or a personal digital assistant (PDA), or an embedded device (in, e.g., an automobile or a kitchen appliance). Rather, FIG. 1 illustrates the components for performing example techniques described in this disclosure.

Additional examples of device 50 include a personal music player, a video player, a display device, a camera, a television, a set-top box, a broadcast receiver device, a server, an intermediate network device, a mainframe computer or any other type of device that processes and/or displays graphical data. For purposes of description, the examples are described with respect to device 50 being a wireless communication device with the understanding that the examples may be extended to other examples of device 50.

As illustrated in the example of FIG. 1, device 50 includes central processing unit (CPU) 52, a graphical processing unit (GPU) 80 and local memory 20 of GPU 80, user interface 22, memory controller 24 that provides access to system memory 56, display processor 54, and display interface 78 that outputs signals that cause graphical data to be displayed on one or more displays 58. Bus 68 provides the interconnection of the various components.

Although the various components are illustrated as separate components, in some examples the components may be combined to form a system on chip (SoC). As an example, CPU 52, GPU 80, display processor 54, and display interface 78 may be formed on a common integrated circuit (IC) chip. In some examples, one or more of CPU 52, GPU 80, display processor 54, and display interface 78 may be in separate IC chips. Various other permutations and combinations are possible, and the techniques should not be considered limited to the example illustrated in FIG. 1. In some embodiments, device 50 may not include a display processor 54 as a separate component, and any processing, as described herein as performed by a display processor, may be performed by, for example, CPU 52 or GPU 80.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), Double Data Rate (DDR) RAM, erasable programmable ROM (EPROM), electrically erasable programmable ROM (EEPROM), flash memory, a magnetic data media or an optical storage media.

The various units illustrated in FIG. 1 communicate with each other using bus 68. Bus 68 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

One or more display panels 58 display information to the user. The terms display, display panel, or panel maybe used interchangeably. Examples of one or more displays 58 include a monitor, a liquid crystal display (LCD), a plasma display panel, a light emitting diode (LED) array, a touch panel, and the like.

In some examples, there may be only one display panel 58 in device 50, such as one large screen that also functions as user interface 22. In some examples, there may be a plurality of displays 58. Display panel 58 may be in a static orientation. In another embodiment, display panel 58 can be a device where the orientation can be changed and the mode (portrait or landscape) may be automatically updated.

There may be one GPU, like GPU 80, and one display interface, like display interface 78, associated with each one of displays 58, or there may be a single GPU 80 and single display interface 78 for each one of displays 58. In the examples described in this disclosure, there is one GPU 80 and one display interface 78 for each one of displays 58. However, the example techniques are applicable also to where there are multiple ones of GPU 80 and multiple ones of display interface 78.

Display processor 54 (also known as a display engine) may include one or more hardware units that retrieves images stored in system memory 56, performs one or more image processing operations on the retrieved images, and outputs the processed images to display(s) 58. In other words, display processor 54 retrieves an image from system memory 56 and may output values that cause the pixels of display(s) 58 to illuminate to display the image. In some examples, display processor 54 may be configured to perform image processing operations on the image retrieved from system memory 56 to be displayed by display(s) 58. Such image processing operations may include format converting, scaling, rotation, blending, compositing, layering of the image with additional graphics, and the like. In general, display processor 54 may perform some operations that are generally not expected to change the content of images in some use cases (e.g., compositing operations), and may perform other operations that are generally expected to change the content of image in such use cases (e.g., by adjusting hue, saturation, brightness, etc.).

The configuration of display processor 54 in FIG. 1 is exemplary. In other examples, display processor 54 may be configured to receive visual content from any source, such as CPU 52, GPU 80, or any digital signal process (DSP), camera processor, video processing unit, image processing unit, pixel processing unit, memory storing visual content, or any other source.

As used herein, the term "visual content" includes but is not limited to any graphics data, graphical data, video data, image data, pixel data, graphics content, graphical content, video content, image content, pixel content, and/or any other type of content that may be displayed.

User interface 22 is used in this disclosure to generically refer to ways in which a user may interact with device 50. In some examples, user interface 22 may be part of one or more displays 58, such as in examples where one of displays 58 is a touch panel.

CPU 52 may be a general-purpose or a special-purpose processor that controls operation of device 50. A user may provide input to device 50 to cause CPU 52 to execute one or more software applications. The software applications that execute on CPU 52 may include, for example, a graphical user interface application or another program. As an example, CPU 52 may execute one or more software applications that generate image content for icons shown on one or more displays 58.

The above example applications that CPU 52 executes are examples where CPU 52 generates image content for display. However, there may be other example applications that CPU 52 executes that do not generate image content such as the operating system. Furthermore, rather than executing applications to generate the image content, CPU 52 may be hardwired to generate the image content.

There may be various combinations and permutations of using fixed-function and programmable circuitry for CPU 52 to generate information that is to be displayed on one or more displays 58. The above provide some examples, and such examples should not be considered limiting.

The software applications that execute on CPU 52 may include one or more graphics rendering instructions that instruct GPU 80 to cause the rendering of graphics data for storage in system memory 56 and/or for display on display panel 58. In some examples, the software instructions may conform to a graphics application programming interface (API), such as, e.g., an Open Graphics Library (OpenGL®) API, an Open Graphics Library Embedded Systems (OpenGL® ES) API, an OpenCL™ API, a Direct3D® API, an X3D® API, a RenderMan® API, a WebGL™ API, or any other public or proprietary standard graphics API. The techniques should not be considered limited to requiring a particular API.

Memory controller 24 facilitates the transfer of data going into and out of system memory 56. For example, memory controller 24 may receive memory read and write commands, and service such commands with respect to system memory 56 in order to provide memory services for the components in device 50. Memory controller 24 is communicatively coupled to system memory 56. Although memory controller 24 is illustrated in the example of device 50 of FIG. 1 as being a processing circuit that is separate from both CPU 52 and system memory 56, in other examples, some or all of the functionality of memory controller 24 may be implemented on one or both of CPU 52 and system memory 56.

System memory 56 may store program modules, instructions and/or data that are accessible by display processor 54, CPU 52, and/or GPU 80. For example, system memory 56 may store user applications (e.g., instructions for a video player application), resulting images from a camera and/or GPU 80, and the like. System memory 56 may additionally store information for use by and/or generated by other components of device 50. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 56 may include instructions that cause display processor 54, CPU 52, GPU 80, and display interface 78 to perform the functions ascribed to these components in this disclosure. Accordingly, system memory 56 may be a computer-readable storage medium having instructions stored thereon that, when executed, cause one or more processors (e.g., display processor 54, CPU 52, GPU 80, and display interface 78) to perform various functions.

In some examples, system memory 56 is a non-transitory storage medium. The term "non-transitory" indicates that the storage medium is not embodied in a carrier wave or a propagated signal. However, the term "non-transitory" should not be interpreted to mean that system memory 56 is non-movable or that its contents are static. As one example, system memory 56 may be removed from device 50, and moved to another device. As another example, memory, substantially similar to system memory 56, may be inserted into device 50. In certain examples, a non-transitory storage medium may store data that can, over time, change (e.g., in RAM).

Display processor 54, CPU 52, and GPU 80 may store image data, and the like in respective buffers that are allocated within system memory 56. Display interface 78 may retrieve the data from system memory 56 and configure display panel 58 to display the image represented by the generated image data. In some examples, display interface 78 may include a digital-to-analog converter (DAC) that is configured to convert the digital values retrieved from system memory 56 into an analog signal consumable by display panel 58. In other examples, display interface 78 may pass the digital values directly to display panel 58 for processing.

Figure 6:
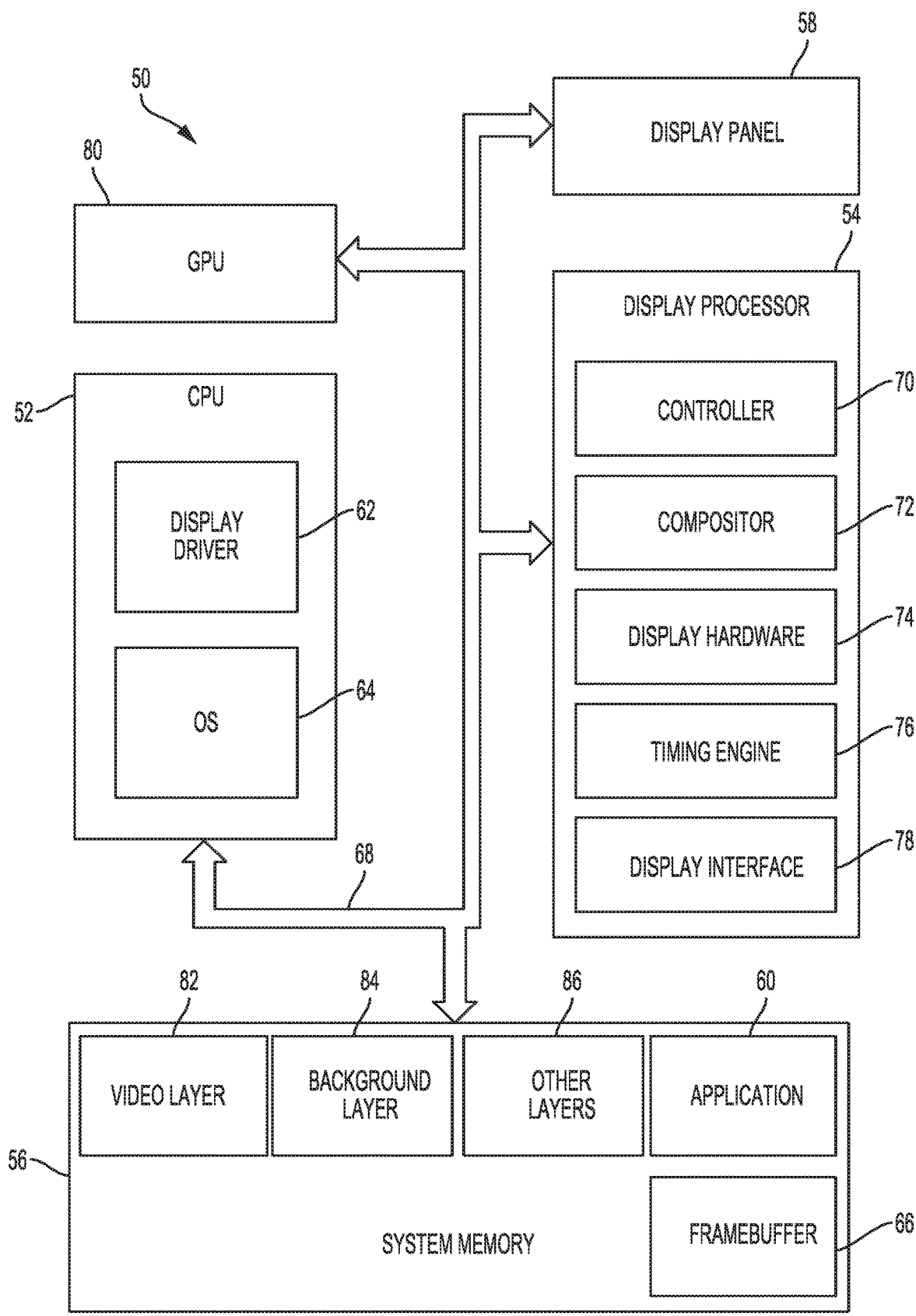
FIG. 6 is a block diagram illustrating the device of FIG. 1 in further detail in accordance with one or more example techniques described in this disclosure.

This disclosure describes example techniques for display processor 54 to detect whether a layer of constant color information is being fed from application to display processor 54. Display processor 54 may read in at least one frame of background layer 84 (as shown in FIG. 6) from system memory 56. Display processor 54 may determine whether the frame of background layer 84 is a constant color. If background layer 84 is a constant color, display processor 54 may stop fetching background layer 84 from system memory 56. Instead, display processor 54 may generate a background layer (without fetching from system memory 56) for display on display panel 58. Controller 70 may monitor a data integrity check value to determine whether a layer was changed, by e.g., comparing an integrity check value of the present frame of the generated background layer with an integrity check value of aa frame of background layer 84 stored in system memory 56.

Figure 2:
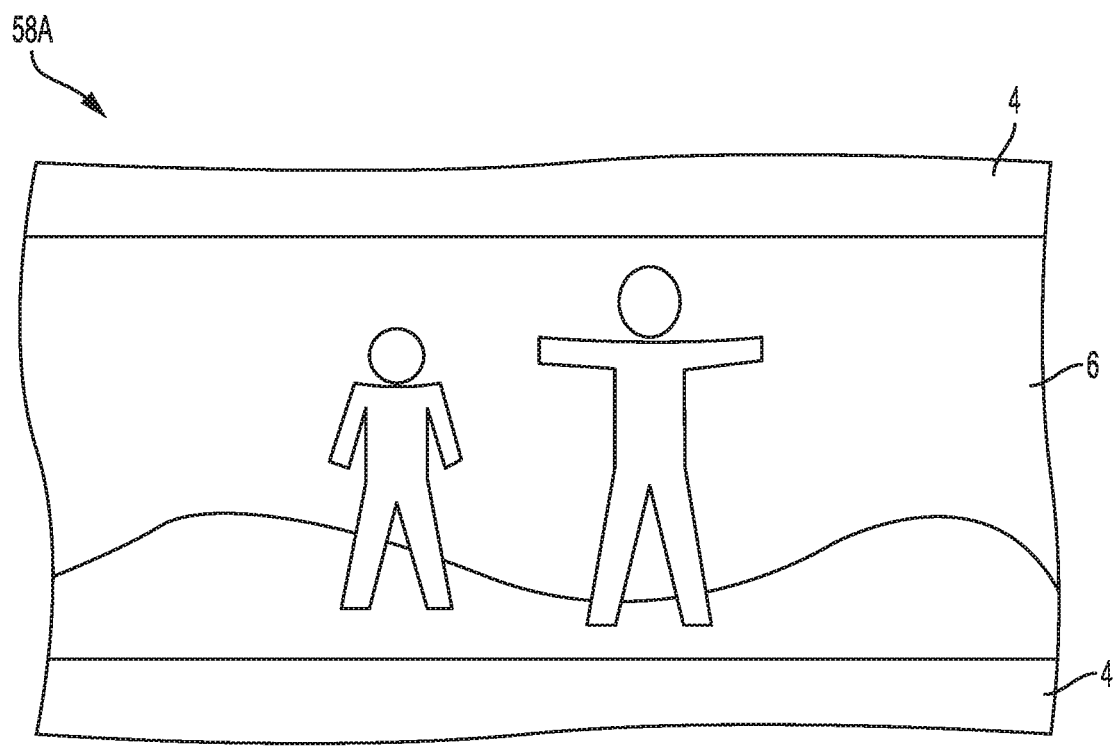
FIGS. 2-4 illustrate three exemplary displays which are displaying a video.
Figure 3:
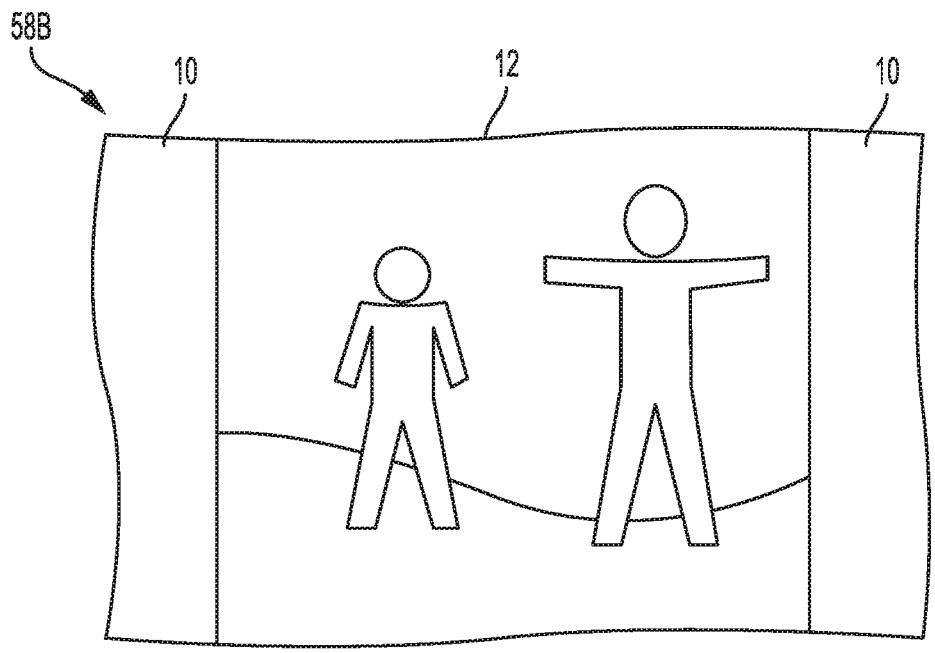
Figure 4:
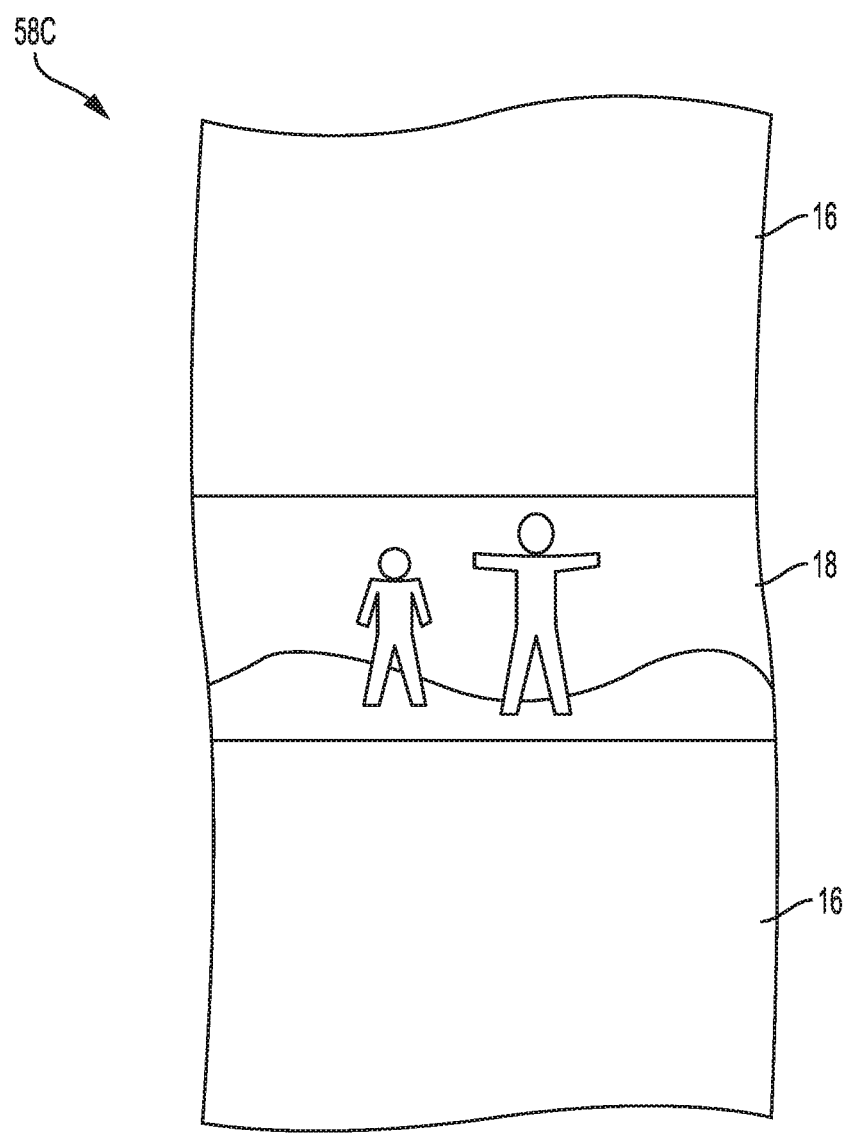

FIGS. 2-4 illustrate exemplary frames of videos displaying on display panels 58A-C. FIGS. 2 and 3 illustrate display panels 58A and 58B displaying in landscape mode and FIG. 4 illustrates display panel 58C displaying in portrait mode. In some examples, applications, including those that perform video playback, may render the background layer to show letter boxing or pillar boxing whenever the aspect ratio of the video frame is different than display panel aspect ratio (as illustrated in FIGS. 2-4).

FIGS. 2-4 illustrate display panels 58A-C. A video application executing on a display panel can include multiple layers including one or more background layers 4, 10, and 16 and foreground video layers 6, 12, and 18. FIGS. 2 and 3 illustrate display panels 58A and 58B in a landscape orientation displaying video with two different aspect ratios. In an embodiment, displays 58A and 58B are the same display displaying video in different aspect ratios. FIG. 2 illustrates an image or a frame from video content with a widescreen aspect ratio (relative to the aspect ratio of display panel 58). In some embodiments, widescreen may refer to an aspect ratio with a width-to-height aspect ratio greater than 1.37:1 or 4:3, while, in other embodiments, widescreen may refer to a relative aspect ratio of video content that has a greater width-to-height aspect ratio compared to that of display panel 58. Full screen may refer to video content with a 4:3 aspect ratio, full screen may refer to video content with an aspect ratio with a width-to-height aspect ratio of less than 1.37:1, or full screen may refer to video content with an aspect ratio with a smaller width-to-height aspect ratio compared to that of display panel 58. In the configuration illustrated in FIG. 2, a video application may use letter boxes to retain the original aspect ratio of the video when the aspect ratio is different from the aspect ratio of display panel 58A. FIG. 2 illustrates video layer 6 bounded above and below by letter boxes created by background layer 4. In one example, the top and bottom bars (i.e., letter boxes) are part of a single layer (background layer 4) with a 1440×2560 pixel size video (video layer 6) on a 1600×2560 pixel panel which may also be the dimensions of background layer 4. Video content may be scaled (up or down) when forming a layer which may then be overlaid on background layer 4 on display panel 58A.

FIG. 3 illustrates a full screen aspect ratio (relative to the aspect ratio of display panel 58B). In the configuration illustrated in FIG. 3, a video application may use pillar boxes to retain the original aspect ratio of the video frame when the aspect ratio is different from the aspect ratio of display panel 58B. FIG. 3 illustrates video layer 12 bounded on the right and left side by pillar boxes created by background layer 10.

FIG. 4 illustrates display panel 58C displaying in portrait mode illustrating video layer 18 bounded by letter boxes above and below created by background layer 16 due to the relative widescreen aspect ratio of video layer 18. In some examples, when a display panel 58C is rotated, device 50 may detect an orientation change (via, e.g., an accelerometer) and automatically rotate the frame to be displayed on display panel 58C such that video layer 6, 12, or 18 remains in the correct orientation. After display panel 58C rotates, video that may have been bordered by pillar boxes (e.g., as illustrated in display panel 58B of FIG. 3) may be bordered by letter boxes (e.g., as illustrated in display panel 58C of FIG. 4). In other examples, not illustrated, video may be bounded by a single letter or pillar box, by a combination of a pillar box and a letter box, or surrounded (bordered) by a background layer on three or four sides.

In some examples, the purpose of the background layer is to show the video content in either letter box or pillar box format. That is, the video content is shown in its original aspect ratio without stretching or zooming. Thus, an application may generate a background layer where a letter box or pillar box is used after determining that the aspect ratio of display panels 58A-C is different than the aspect ratio of the video content. The display overlay engine (e.g., display processor 54) is configured to fetch the full background layer. In some examples, such as those shown in FIGS. 2-4, the background layer is of a constant color. That is, every pixel of the background layer is the same color (e.g., all black, all gray, all white, all red). While this may occur with letter box and pillar box video formatting, background layers of a constant fill color may occur in other applications. Fetching constant fill color pixels of a background layer is a costly memory operation, considering that the pixels of a single color are repeated in the layer.

In some examples, to process the video for display, display processor 54 of device 50 may fetch, from system memory 56, both the foreground video layer (e.g., one of foreground video layers 6, 12, or 18) and the background layer (e.g., one of background layers 4, 10, or 16) to send to display hardware in display processor 54 to be composited for display. Even though, as illustrated, background layers 4, 10, and 16 are just an unchanging single-color layer the size of display panel 58, device 50 may be configured to fetch each pixel from memory to create the letter/pillar box effect.

Thus, exemplary systems and methods demonstrate reducing the number of fetches performed when a background layer (e.g., letter or pillar box) to be displayed is of a constant fill color. Display processor 54 may be configured to detect that a background layer is of a constant fill color. If so, rather than fetching the background layer from memory, the one or more processors may be configured to generate the constant fill color for the background layer. In doing so, there may be a reduction in the number of memory fetches performed, as only the video layer is fetched rather than both the video layer and the constant fill background layer. Reducing the number of memory fetches may also result in power savings, due to the reduction in the use of system memory 56 for fetching operations, which may improve battery life on battery-powered devices. This may also result in less traffic on memory bus interfaces.

FIG. 5 is a table illustrating compositor layer data from a display compositor (e.g. SurfaceFlinger display compositor in a Google® Android™ implementation) of the present techniques. Table 150 illustrates data that describes one or more executions of a command which provides layer information during the composition cycle for a display compositor (e.g. a "dumpsys SurfaceFlinger" command) that may output a hardware composer state. The hardware composer state may include a listing of the status of each layer handled by a hardware composer. Hardware composer may be a software abstraction layer on top of display hardware. For example, operating system 64 (of FIG. 6), e.g. a Google® Android™ operating system, may provide functionality to compose layers and may be based on hardware capability. Table 150 has rows that correspond to the displays illustrated in FIG. 2 (Letter box (Landscape) 152), FIG. 3 (Pillar box (Landscape) 154), and FIG. 4 (Letter box (Portrait) 156). Each row corresponds to a layer present on device 50. Table 150 has columns that correspond to: type (what device is handling the layer, e.g., Hardware Composer (HWC) on display processor 54 or GLES (OpenGL (Open Graphics Library) for Embedded Systems on the GPU), handle (a unique layer identifier), hints (information on how to compose the layer), flags (e.g., multiple rectangles in the layer, or whether the layer is secure/non-secure), tr (transformation or rotation information e.g., if a layer is rotated 0° or 90°), blend (additional flags, e.g., plane alpha (transparency)), form at (picture format), source crop (the section of an image that will be displayed, which may include the full resolution of the video or layer), frame (where the section of the source image is going to be situated in the final frame, which may include the full resolution of the video or layer), and name (the source file name/location).

Specifically, each of the bullets listed first under Letter box (Landscape) 152, Pillar box (Landscape) 154, and Letter box (Portrait) 156 shows data corresponding to an exemplary video layer. Each of the bullets listed second illustrates data corresponding to an exemplary background layer.

A technique of the present disclosure is to reduce the number of fetches performed when a background layer (e.g., letter or pillar box) to be displayed is of a constant fill color. One or more processors (e.g., a display processor) may be configured to detect that a background layer is of a constant fill color. If so, rather than fetching the background layer from memory, the one or more processors may be configured to generate the constant fill color for the background layer. In doing so, there may be a reduction in the number of memory fetches performed, as only the video layer is fetched rather than both the video layer and the constant fill background layer). By replacing the fetched layer with a constant fill, there may be a reduction in memory fetch operations (as only the video layer is fetched) and therefore power savings (e.g., battery usage) at memory and bus interfaces, decreased use of the bandwidth at the bus and memory, and decreased processor usage.

FIG. 6 is a block diagram of the device of FIG. 1 in further detail in accordance with one or more example techniques described in this disclosure. FIG. 6 illustrates device 50, examples of which include, but are not limited to, video devices such as media players, set-top boxes, wireless handsets such as mobile telephones (e.g., so-called smartphones), personal digital assistants (PDAs), desktop computers, laptop computers, gaming consoles, video conferencing units, tablet computing devices, and the like.

Shown in FIG. 6 is a central processing unit (CPU) 52, graphics processing unit (GPU) 80, display processor 54, system memory 56, and display panel 58 of device 50. As shown in FIG. 6, CPU 52 is communicatively coupled to each of GPU 80, display processor 54 and system memory 56 and display panel 58, via bus 68. In examples where device 50 is a mobile device, display processor 54 can be a mobile display processor (MDP). Display processor 54 and GPU 80 may be located on the same microchip as CPU 52 forming a system on a chip (SoC), or may be in a separate microchip. Each of the foregoing components may be resident on the same or different integrated circuits in device 50 and may reside in a single or multiple housings.

Examples of CPU 52, GPU 80, and display processor 54 include, but are not limited to, one or more digital signal processors (DSPs), general purpose microprocessors, application specific integrated circuits (ASICs), field programmable gate/logic arrays (FPGAs), or other equivalent integrated or discrete logic circuitry. In some examples, GPU 80 and display processor 54 may be specialized hardware that includes integrated and/or discrete logic circuitry that provides GPU 80 and display processor 54 their processing capabilities. For instance, display processor 54 may be specialized integrated circuit hardware that is designed to retrieve image content from system memory 56, compose the image content into an image frame, and output the image frame to display panel 58.

In general, CPU 52, GPU 80, and display processor 54 are examples of processing circuits configured to perform the example techniques described in this disclosure. The processing circuit includes fixed-function circuitry and/or programmable circuitry. Accordingly, the example techniques may be performed with fixed-function circuitry, programmable circuitry, or a combination of fixed-function and programmable circuitry.

The various units illustrated in FIG. 6 communicate with each other using bus 68. Bus 68 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect (such as a Display Serial Interface (DSI) bus or one or more pipes). It should be noted that the specific configuration of buses and communication interfaces between the different components shown in FIG. 6 is merely exemplary, and other configurations of computing devices and/or other image processing systems with the same or different components may be used to implement the techniques of this disclosure.

Although not illustrated, device 50 may include a user interface and/or a transceiver module. Device 50 may include additional modules or units not shown in FIG. 6 for purposes of clarity. For example, device 50 may include a speaker and a microphone, neither of which are shown in FIG. 6, to effectuate telephonic communications in examples where device 50 is a mobile wireless telephone. Furthermore, the various modules and units shown in device 50 may not be included in every example of device 50. For example, display panel 58 may be external to device 50 in examples where device 50 is a desktop computer. As another example, a user interface may be part of display panel 58 in examples where display panel 58 is a touch-sensitive or presence-sensitive display of a mobile device.

Display panel 58 may be a liquid crystal display (LCD), a light-emitting diode (LED), an organic LED (OLED), a plasma display, a touch-sensitive display, a presence-sensitive display, or another type of display device. A user interface may include, but is not limited to, a trackball, a mouse, a keyboard, and other types of input devices. The user interface may also be a touch screen and may be incorporated as a part of display panel 58. A transceiver module may include circuitry to allow wireless or wired communication between device 50 and another device or a network. The transceiver module may include modulators, demodulators, amplifiers, and other such circuitry for wired or wireless communication.

As illustrated, CPU 52 is configured to execute one or more applications 60 (stored in system memory 56), display driver 62, and operating system (OS) 64. Display processor 54 includes a controller 70, compositor 72, display hardware 74, timing engine 76, and display interface 78.

In some examples, controller 70, compositor 72, display hardware 74, and timing engine 76 may be fixed-function circuits. In some examples, controller 70, compositor 72, display hardware 74, and timing engine 76 represent programmable circuits that are programmable to perform the example techniques. In general, the example techniques of display processor 54 may be performed by fixed-function, programmable, or a combination of fixed-function and programmable circuits.

Application 60, display driver 62, and OS 64 are software applications executing on CPU 52 to perform the example techniques described in this disclosure. However, the techniques are not so limited. In some examples, one or more of application 60, display driver 62, and OS 64 may be formed as fixed-function circuits. Accordingly, the example techniques may be performed by fixed-function circuits, programmable circuits, or a combination of fixed-function and programmable circuits.

System memory 56 may store program modules and/or instructions and/or data that are accessible by CPU 52, GPU 80, and display processor 54. For example, system memory 56 may store user applications (e.g., instructions for a video player like application 60), one or more frame buffer 66 for display (including, e.g., a video frame) from display processor 54 or GPU 80, buffers (e.g., buffer queues) that hold layer data such as video layer 82, background layer 84, and other layers 86, etc. System memory 56 may additionally store information for use by and/or generated by other components of device 50. System memory 56 may include one or more volatile or non-volatile memories or storage devices, such as, for example, random access memory (RAM) such as Double Data Rate (DDR) RAM, static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 56 may include instructions that cause CPU 52, GPU 80, and display processor 54 to perform the functions ascribed to these components in this disclosure. Accordingly, system memory 56 may be a computer-readable storage medium having instructions stored thereon that, when executed, cause one or more processors (e.g., CPU 52, GPU 80, and display processor 54) to perform various functions.

In some examples, system memory 56 is a non-transitory storage medium. The term "non-transitory" indicates that the storage medium is not embodied in a carrier wave or a propagated signal. However, the term "non-transitory" should not be interpreted to mean that system memory 56 is non-movable or that its contents are static. As one example, system memory 56 may be removed from device 50, and moved to another device. As another example, memory, substantially similar to system memory 56, may be inserted into device 50. In certain examples, a non-transitory storage medium may store data that can, over time, change (e.g., in RAM).

CPU 52 may execute various types of applications. Examples of the applications include web browsers, e-mail applications, spreadsheets, video games, media player applications, or other applications that generate viewable objects for display. System memory 56 may store instructions for execution of the one or more applications. The execution of application 60 on CPU 52 causes CPU 52 to produce graphics data for image content that is to be displayed. CPU 52 may transmit graphics data of the image content to GPU 80 for further processing, the processing based on instructions or commands that CPU 52 transmits to GPU 80. CPU 52 may receive information from various sensors resident on device 50. In one example, a sensor may include an accelerometer that may allow CPU 52 to determine the orientation of device 50.

CPU 52 may communicate with GPU 80 in accordance with a particular application processing interface (API). Examples of such APIs include the DirectX® API by Microsoft®, the OpenGL® API or OpenGL ES® API by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and CPU 52 and GPU 80 may utilize any technique for communication.

Application 60 may include at least some of one or more instructions that cause graphic content to be displayed or one or more instructions that cause a non-graphics task (e.g., a general-purpose computing task) to be performed on CPU 52 or GPU 80. CPU 52 or GPU 80, in turn, may generate one or more layers for storage in system memory 56. For example, video layer 82 is generated to store and blend video content (from e.g., a video file). Where the aspect ratio of display panel 58 is different from the aspect ratio of video layer 82, background layer 84 may be generated by application 60 to provide a background layer to fill the parts of the display unfilled by the video. Background layer 84 may include a constant color (e.g., black, white, etc.) layer that when blended with video layer 82 creates letter or pillar boxes. Display processor 54 may retrieve image content such as video layer 82, background layer 84, and other layers 86 via bus 68 and perform image processing to generate the image content for display.

Display processor 54 may be configured to composite the various content on layers 82, 84, and 86 stored in system memory 56 for display on display panel 58. For instance, in addition to communication via bus 68, display processor 54 may be coupled to system memory 56 via one or more pipes (e.g., a hardware plane or a Mobile Display Sub-System (MDSS) pipe). Display processor 54 may be configured to retrieve the video content and layer information of layers 82, 84, and 86 from different applications executing on CPU 52 (e.g., a video player application such as application 60) or image content generated from GPU 80, stored in system memory 56.

As an example, CPU 52 may execute a plurality of applications that each generate image content (e.g., video content). For instance, CPU 52 may execute a video player application that uses a hardware or software video decoder (not shown) to generate video content that is stored in system memory 56. CPU 52 may also generate other layers such as background layer 84 used to create letter or pillar boxes around video content (in e.g., video layer 82) (or, may be, for instance, a constant color layer used in closed captioning) or other layers 86 which may include image wallpaper, launcher, status bar, navigation bar layers, and/or closed caption text. As another example, CPU 52 may execute a web browser that produces text content that is stored in system memory 56. Application 60 may generate video layer 82 and background layer 84. Other layers 86 may be generated by application 60, or OS 64. Layers 82, 84, and 86 may be considered as image layers having a backmost layer, a front most layer, and intermediate layers that may or may not overlay on top of one another. For instance, video layer 82 may overlay and occlude part of background layer 84. In some examples, other layers 82 may either be visible (overlaid) or occluded depending on user action or system defaults. In the video player application example, video layer 82 is an image layer having a higher order than background layer 84.

Display processor 54 retrieves the image content, and composites one single frame for display. For example, image (e.g., layer) content from one application may occlude image (e.g., layer) content from another application, and display processor 54 may ensure that the image content that is occluded does not interfere with the image content that is occluding. In general, compositing means that display processor 54 stitches image content from different applications into a single frame. Display processor 54 may perform additional functions such as filtering as well.

According to techniques of the present disclosure, controller 70 of display processor 54 may detect whether a layer of constant color information is being fed from application 60 to display processor 54. For example, if application 60 sends a black (or any single color) layer as a background (e.g., background layer), instead of fetching background layer 84 from system memory 56, display processor 54 may identify that the layer has only a constant color (by means of, e.g., a histogram), and display hardware 74 of display processor 54 may generate the pixels of the background layer and select a color for the background layer such that there is no memory fetch.

Display processor 54 may read in at least one frame of background layer 84 from system memory 56. Controller 70 of display processor 54 may determine whether the frame of background layer 84 is a constant color. A constant color refers to a single color of pixel data that is used throughout background layer 84. If background layer 84 is a constant color, controller 70 of display processor 54 may stop fetching background layer 84 from system memory 56. Instead, display processor 54 may generate background layer 84 for display on display panel 58. Controller 70 may monitor a data integrity check value to determine whether a layer (such as background layer 84) is unchanging. Such a data integrity check value may be a cyclic redundancy check (CRC) code, a checksum, a hash value, or other type of value generated to check the validity of raw data (e.g., image data). A CRC code is an error-detecting code that is often used to detect changes in data. CRCs are generated using cycle codes that produce a value that is a function of one or more characteristics of the raw data (e.g., image data). A hash function is a function that maps data of an arbitrary size to data of a fixed size. Hash functions are sometimes used in a hash table for accelerated lookup of duplicated records. Hash functions may also be used to generate data integrity check values for image data before and after processing. A checksum is data produced by an algorithm operating on data (e.g., image data) in order to detect errors during transmission, processing, or storage. In other examples, such a check value may be a multiple independent signature register (MISR), a linear feedback shift register (LFSR), and the like, though other techniques may be used.

Controller 70 may monitor feedback of the data integrity check, e.g., the CRC, for compositor 72 for each frame and determine whether the layer (e.g. background layer 84) is unchanging. Monitoring CRC feedback may include reviewing feedback to the display overlay engine (e.g., multimedia display processor (MDP) or display processor 54 (e.g., a Multiple-Input Signature Register (MISR) block)). A constant (unchanging) CRC across multiple (e.g., three) frames of the background layer indicate that the color is not changing. CRC information may be stored alongside layer data in system memory 56 and may be retrieved by display processor 54 to determine the layer is unchanging. This may indicate that a constant color is being fed from application 60 to compositor 72 of display processor 54. Controller 70 may (in conjunction or alternatively) monitor the histogram of the background layer. The histogram may be calculated by display processor 54. Display processor 54 may feed the calculated histogram value to compositor 72 (or a software display compositor). Based on the feedback, compositor 72 may drop the constant colored layer (background layer 84) from the composition, only using the generated fill layer. The histogram may act as a representation of the tonal (e.g., pixel value) distribution in the background layer. The image histogram may indicate how many pixels are repeated on a per color basis. For an entirely black layer, the histogram will show all the pixels with one color. For example, Table 1 illustrates a histogram with colors and the respective pixel count for each color.

TABLE 1

| Color | Count |
|---|---|
| 0x000000 (black) | 255 |
| 0xFFFFFF (white) | 0 |

The display processor 54 may detect a constant histogram color distribution that shows all pixels in the layer are of a constant/single color (e.g. black, white) value. Display processor 54 may determine the number of colors in the layer. The histogram may also be used to determine whether the layer is changing (or remains unchanged). An unchanging histogram may indicate that an unchanging constant color is being fed from application 60 to compositor 72 of display processor 54 (such as in the example of pillar or letter boxes around a video layer). The determination that a layer of constant color information is being fed from application 60 to display processor 54 may be performed every frame. In other examples, however, this determination may be performed at a greater or lesser frequency. In some examples, display processor 54 retrieves the background layer 84 from system memory 56 until a determination is made that the layer is unchanging across multiple frames.

In response to determining that that a constant color is being fed from application 60, display processor 54 (or a Mobile Display Sub-System (MDSS)) may generate the constant color. The constant color may be generated by hardware or software. The generation may avoid the fetching of the constant fill color from system memory 56. The constant fill color may be generated by using the constant fill color of a hardware plane (e.g., an MDSS pipe or solid fill hardware), which processes a layer (e.g., background layer 84). The hardware plane may be configured to self-fetch the constant color without fetching the entire background layer 84 from system memory 56. For example, only a single pixel of pixel color data may be used to generate the entire layer. In another example, dim layer hardware may be used to provide a constant fill color. This may free the source hardware planes so other layers can be assigned to the freed-up pipe (to e.g., fetch other layers). Dim layer hardware (also known as a hardware mixer) on display processor 54 includes hardware configured to brighten or darken layers, e.g. provide an overlay to a layer that makes the entire layer or portions of the layer darker or lighter in color. Dim layer hardware may be configured to uniformly darken at least a portion of the plurality of layers. Compositor 72 (e.g., a display software compositor) may program display processor 54 with a constant color that is received as a feedback from histogram analysis. Display processor 54 may generate the solid fill pixel in hardware instead of fetching the pixel from memory.

In some examples, compositor 72 may determine background layer 84 is a constant color and may be dropped and generated completely at compositor 72. For example, after background layer 84 is retrieved a number of times (e.g., three), controller 70 of display processor 54 may remove the background layer 84 from system memory 56. Specifically, display hardware 74 may detect the color in the layer, e.g., based on the histogram. Display software compositor (e.g., compositor 72) may determine whether the layer has changed (e.g., is a constant color). Compositor 72 may drop background layer 84 from the composition cycle so that display hardware 74 will not fetch background layer 84 from system memory 56. Compositor 72 may program display hardware 74 with the constant color received as feedback, and display hardware 74 may generate the pixel(s) for the background layer.

In an example, display processor 54 may determine that background layer 84 is changing from frame to frame. Where background layer 84 is determined, by display processor 54, to be changing (or has recently changed), display processor 54 may stop generation of pixel data for background layer 84 and begin fetching the pixel data for background layer 84 from system memory 56.

Display processor 54 may fetch non-constant color layers from system memory 56 from e.g., video layer 82 and/or other layers 86 for compositing by compositor 72.

Compositor 72 may define positional information about each layer (where the layer will appear on the display, such as the layers edges and its Z order relative to other layers), and content (whether the information should be cropped or expanded to fill the bounds of the layer), or transformed (e.g., rotated or flipped). Compositor 72 may determine how each layer should be composited with other layers which includes information such as blending mode and a layer-wide alpha value for alpha compositing. Compositor 72 may also perform optimizations such as determining which portions of the layers have been updated since the previous frame.

Display hardware 74 (also known as a mixer) may blend the layers based on information determined by compositor 72. Display hardware 74 may blend or stitch layers fetched from system memory 56 and those generated by display processor 54 to form a single image frame. Controller 70 may receive information indicating the order of image content of layers 82, 84, and 86 and position information where layers 82, 84, and 86 are to be displayed from display driver 62.

Based on the ordering information and positions where layers 82, 84, and 86 are to be displayed, display hardware 74 (also known as a composition circuit) may blend or stitch the image layers. For example, if image content of video layer 82 occludes part of the background layer 84 (and/or other layers 86), then for blending, display hardware 74 may assign or receive information that the part of video layer 82 that occludes part of background layer 84 and/or other layers 86 has an opacity (or alpha) value of one. Accordingly, on the portion of display panel 58 where video layer 82 is to be displayed, display hardware 74 may cause the occluding part of video layer 82 to be displayed rather than the occluded part of background layer 84. Other techniques for blending and stitching are possible. Display processor 54 may store the blended frame in frame buffer 66.

Display processor 54 generates image signals that display processor 54 outputs to display panel 58 that cause display panel 58 to display the blended frame. Timing engine 76 may take the blended frame from a frame buffer 66 for output to display panel 58 for display. In this way, display panel 58 may be configured to display the graphical content (e.g., a video) generated by application 60 to a user.

In many cases, the image content from the applications is not static and is changing. Accordingly, display processor 54 periodically refreshes the image content displayed on display panel 58. For example, display processor 54 periodically retrieves image content from system memory 56, where the image content may have been updated by the execution of the applications (e.g. application 60), and outputs image signals to display panel 58 to display the updated image content via display interface 78.

Display panel 58 may be configured in accordance with a display interface. Such a display interface may include a display interface using the Mobile Industry Processor Interface, Display Serial Interface (MIPI DSI) standard. The MIPI DSI standard supports a video mode and command mode. In examples where display panel 58 is a video mode panel, display processor 54 may need to continuously refresh display panel 58 and display panel 58 does not need or include frame buffer 66. In examples where display panel 58 is a video mode panel, the entire image content is refreshed per refresh cycle (e.g., line-by-line). In examples where display panel 58 is a command mode panel, display panel 58 includes frame buffer 66 to which display processor 54 writes the image content of the frame. Display processor 54 then writes from frame buffer 66 to display panel 58. In such examples where display panel 58 is a command mode panel, display processor 54 may not need to refresh display panel 58 constantly. The rate at which display processor 54 refreshes the image content displayed on display panel 58 is referred to as the display refresh rate. Examples of the display refresh rate include 30 frames per second (fps), 60 fps, 120 fps, or potentially any number of frames per second. For examples where display panel 58 is a video mode panel, having an N fps means that display processor 54 is continuously updating display panel 58 via display interface 78 such that after every 1/N seconds, display panel 58 is refreshed with one entire frame. Continuously refreshing or updating display panel 58 may include refreshing or updating display panel 58 after each frame or, in other examples, after N frames, or M seconds, e.g., 2 frames, 15, frames, 0.1 seconds, etc.

Figure 7:
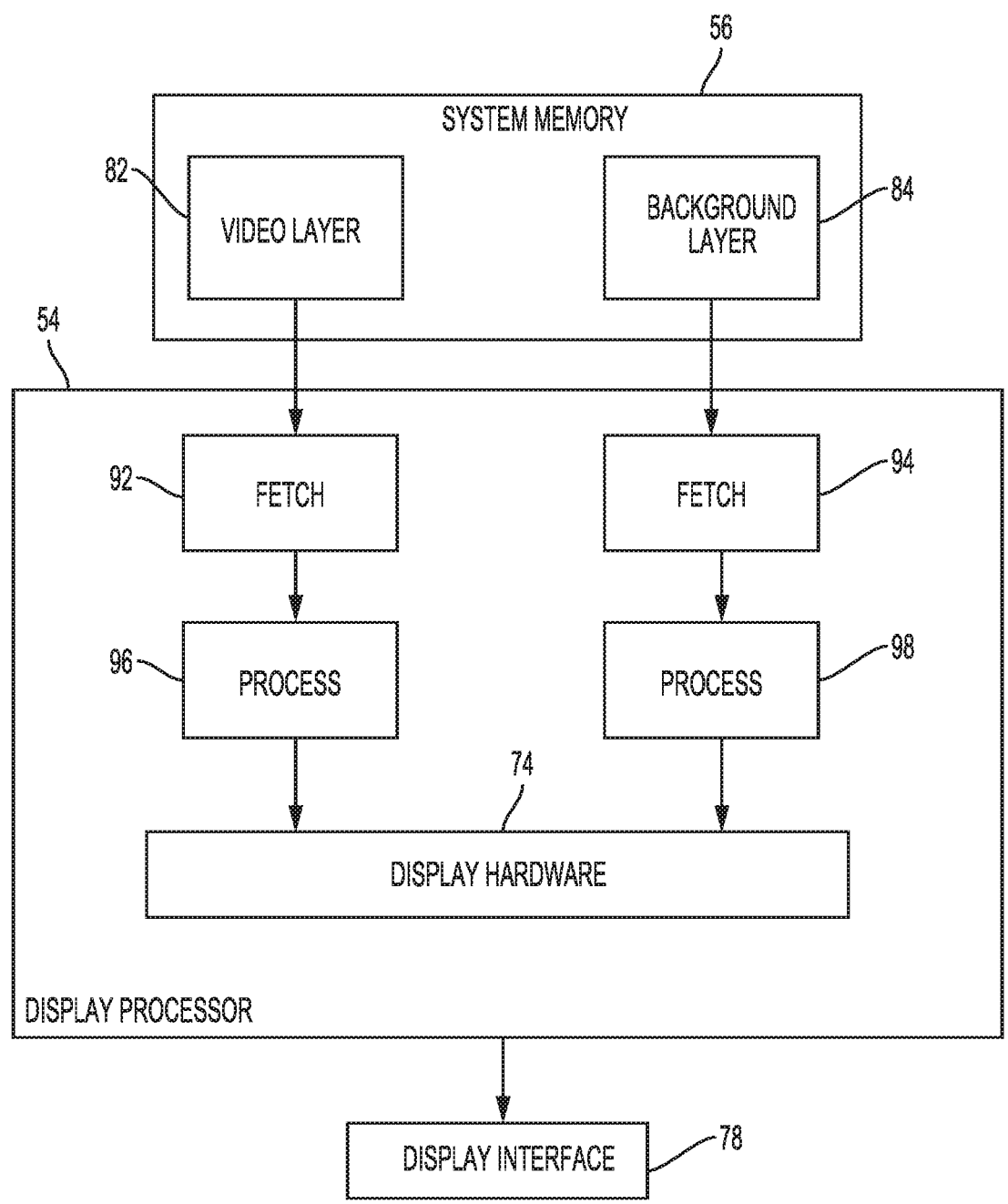
FIG. 7 is a process diagram illustrating an exemplary display compositor pipeline according to techniques of the present disclosure.

FIG. 7 is a process diagram illustrating an exemplary display compositor pipeline. The components in FIG. 7 having the same reference numeral as the components in FIG. 6 are the same or substantially the same. Therefore, those components are not described in further detail. In one example, system memory 56 includes video layer 82 containing video for display and background layer 84 with a constant color background layer to create letter or pillar boxes when blended with video layer 82. Display processor 54 may fetch video layer 82 (92) and fetch background layer 84 (94) from system memory 56. Display processor 54 may process the fetched video layer 82 (96) and process fetched background layer 84 (98). Display hardware 74 may blend the processed video layer 82 and background layer 84 creating a display frame. Display processor 54 may send the display frame to display panel 58 via display interface 78.

Figure 8:
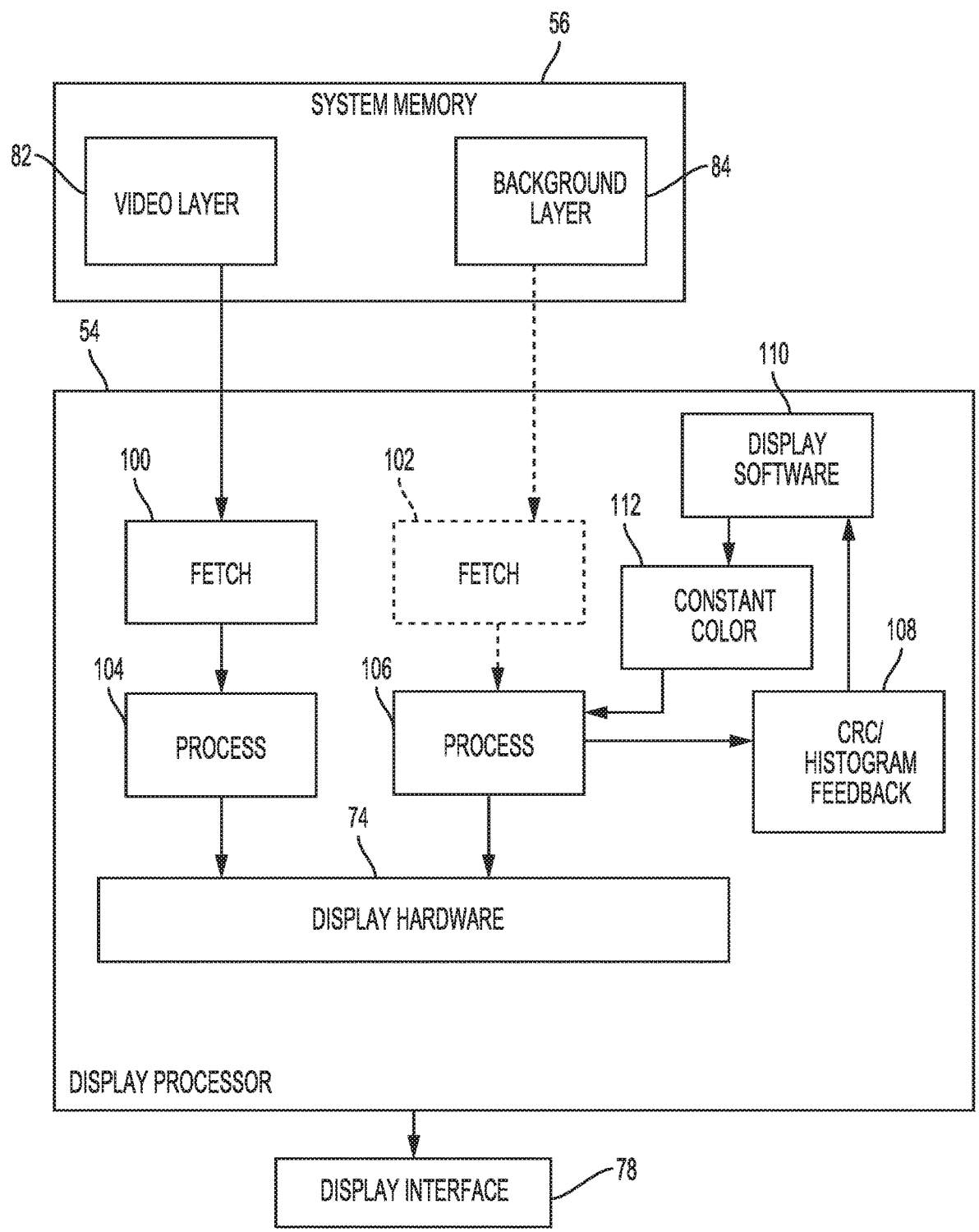
FIG. 8 is a process diagram illustrating an exemplary display compositor pipeline according to techniques of the present disclosure.

FIG. 8 is a process diagram illustrating an exemplary display compositor pipeline according to techniques of the present disclosure. The components in FIG. 8 having the same reference numeral as the components in FIG. 6 are the same or substantially the same. Therefore, those components are not described in further detail. In one example, system memory 56 includes video layer 82 containing video for display and background layer 84 with a constant color background layer to create letter or pillar boxes when blended with video layer 82. Display processor 54 may fetch video layer 82 from system memory 56 (92). Rather than fetch background layer 84 (e.g., entirely) from system memory 56 (102), display processor 54 may detect that a constant color is being fed from application 60 to display processor 54. Detecting whether background layer 84 is a constant color may include determining whether it only contains pixel data of a single color or only a constant perceptible color, via e.g., a histogram. This detection may occur after a number of frames of the background layer 84 have been processed and displayed, e.g., to confirm that the layer is a constant color and unchanging. Display processor 54 may determine whether a constant color is being fed from application 60 (via system memory 56) by examining a previously processed and displayed frame of background layer 84. In one example, display processor 54 may determine a CRC of the background layer 84 stored in a Multiple-Input Signature Register (MISR) block which may be stored alongside background layer 84 in system memory 56 and determine the CRC is the same as the CRC of a previous frame (or a previous threshold of frames) of background layer 84 (108) to determine that background layer 84 is not changing between frames. In another example, display processor 54 may determine that a histogram of background layer 84 shows a single (unchanging) color is in background layer 84 (108) to determine that background layer 84 is not changing between frames.

In response to determining that background layer 84 is a single (unchanging) color being fed from application 60 (via system memory 56), display software may generate the constant color (112). In one example, constant color 112 may be generated via a constant fill color of a hardware plane pipe (e.g., a mobile display sub-system (MDSS) pipe). The hardware plane pipe may output constant color pixels on the clock pulse. The hardware plane (e.g. MDSS) pipe that is used to fetch from system memory 56 may be used to fill the constant color without fetching the entire background layer 84 from system memory 56. In another example, dim layer hardware may generate the constant color 112. Display processor 54 may process the fetched video layer 82 (104) and obtain a generated background layer based on the constant color 112 (106). Display hardware 74 may blend the processed video layer 82 and the generated background layer and any other layers (e.g., other layers 86) creating a display frame. Display processor 54 may send the display frame to display panel 58 via display interface 78.

Figure 9:
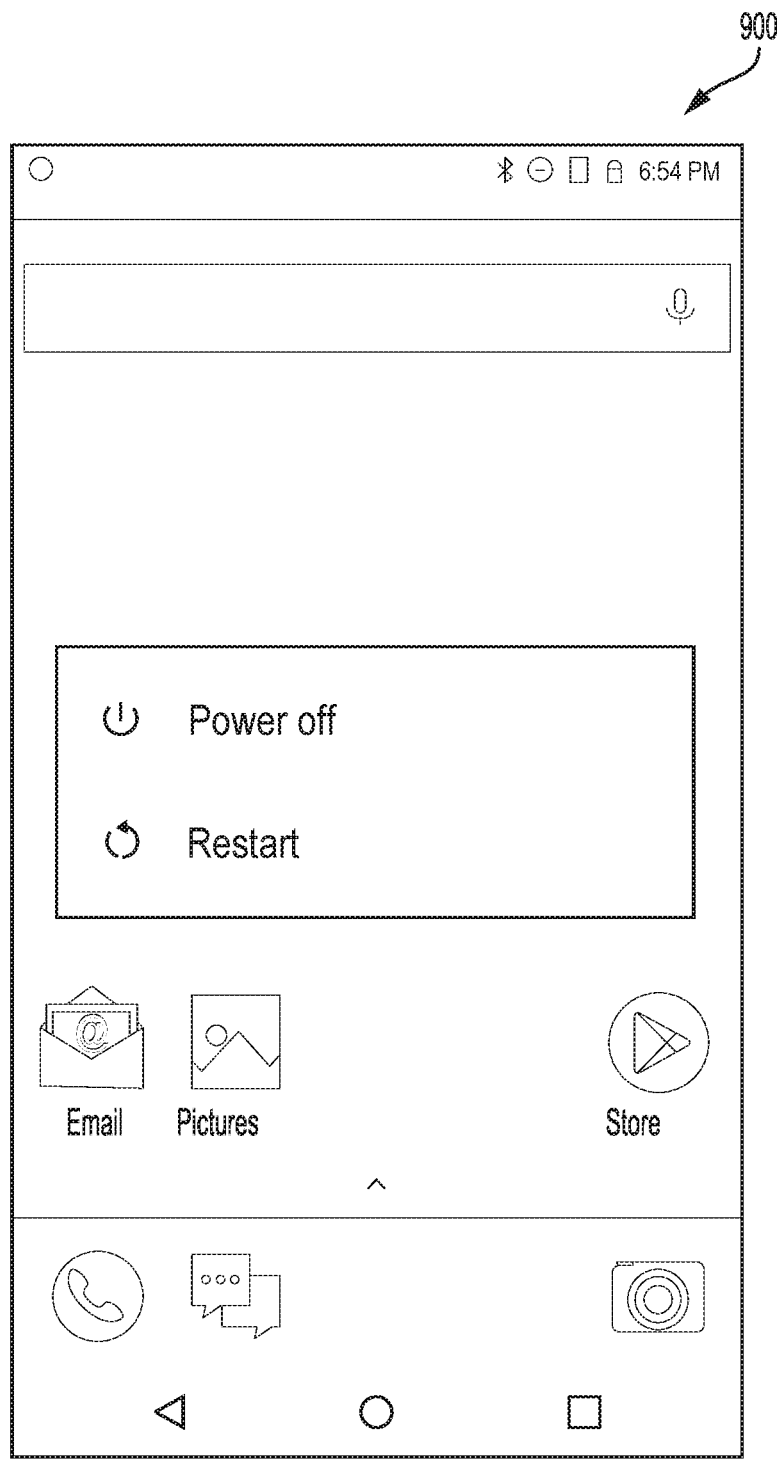
FIGS. 9-10 illustrate two exemplary displays which are displaying a dim layer.
Figure 10:
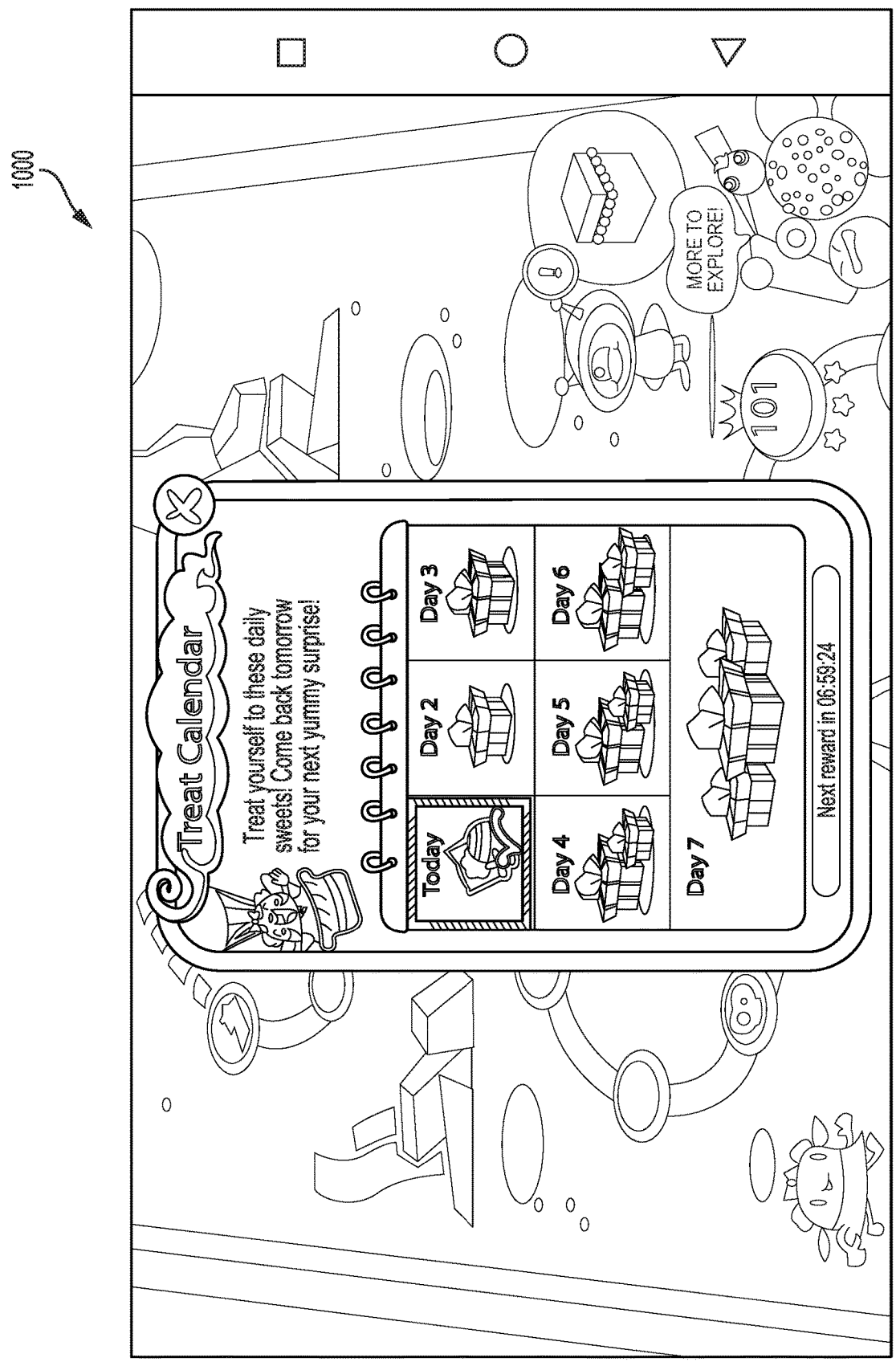

FIGS. 9-10 illustrate two exemplary displays which are displaying a dim layer. FIG. 9 illustrates a screenshot 900, for example, as displayed on a smartphone display. It will be appreciated that the screenshot 900 may be composited from a plurality of layers, include a top layer, a dim layer, and remaining layers underneath. The top layer in screenshot 900 is depicting a pop-up user interface with the inputs "Power off" and "Restart". Underneath the top layer is a dim layer. For example, a dim layer may be characterized by its color (for example, gray or black) and its alpha value (transparency). In one example, alpha values may range between 0 and 1. An alpha value of 0 means that the pixel of the layer do not have any coverage information and is transparent, allowing all layers underneath to show through. An alpha value of 1 means that the pixels of the layer is opaque and none of the layers underneath show through. Example alpha values may be 0.4 (100 as represented in 8-bit binary on a scale from 1 to 255) or 0.5 (125 on a scale from 1 to 255) in game dim layers.

FIG. 10 illustrates a screenshot 1000, for example, as displayed on a smartphone display. As discussed above, the screenshot 1000 may be composited from a plurality of layers. The top layer as illustrated may be a pop-up notification. For example, pop-up notifications may be generated by user applications running on the smartphone. Here, an in-game pop-up notification is illustrated. Similar to the above figures, a dim layer may have a non-zero alpha value, which partially obstructs and otherwise conceals the remaining layers underneath. It will be appreciated the layers may contain any visual content, including icons, graphics, images, pictures, video, or other content.

Figure 11:
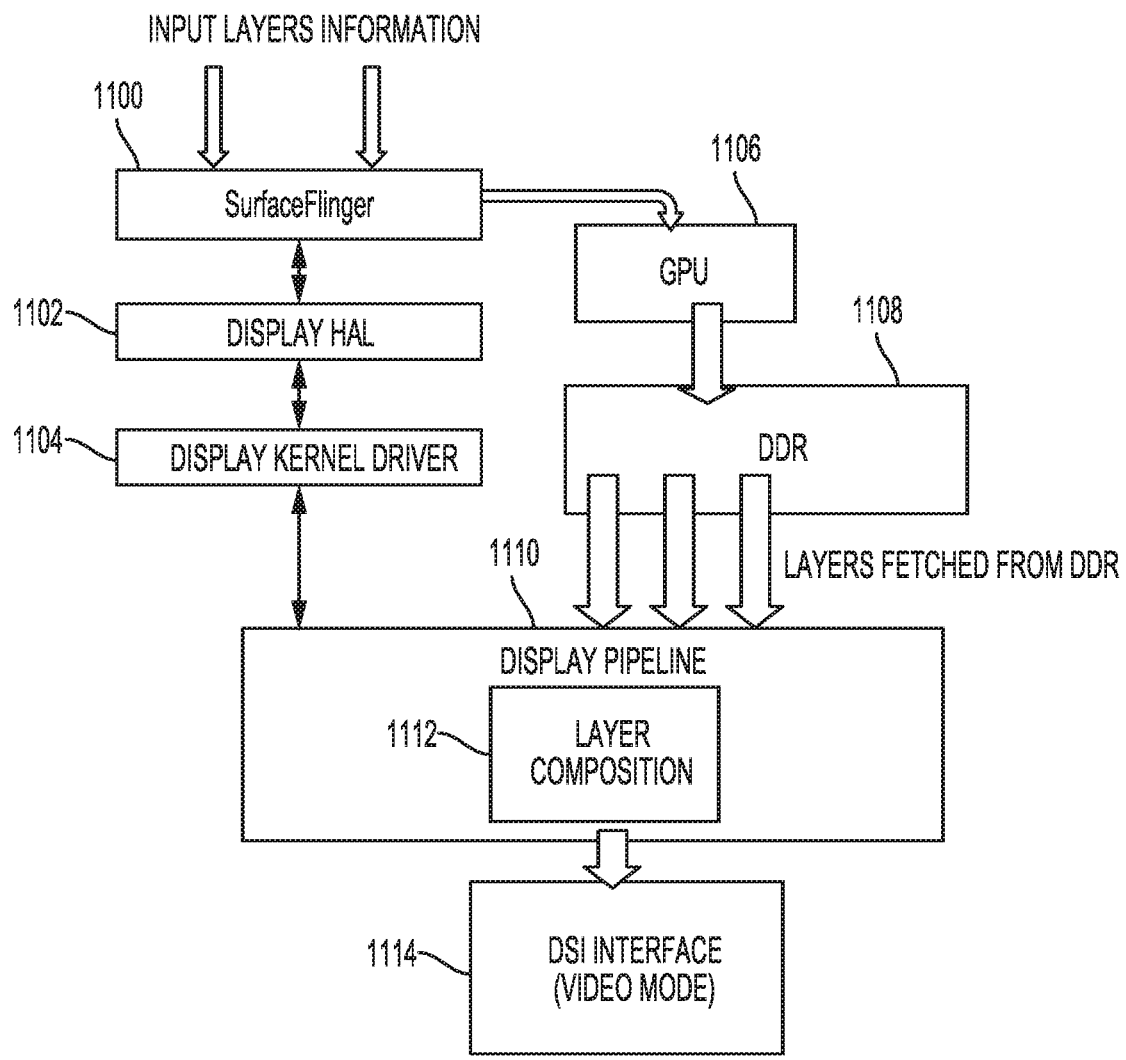
FIG. 11 is a block diagram illustrating data flow through a display pipeline.

FIG. 11 is a block diagram illustrating data flow through a display pipeline. Applications may generate layers to be composited for display to a user. In an Android system, a SurfaceFlinger 1100 consumes image streams from applications generating visual content to be displayed. A display hardware composer HAL 1102 may support other aspects of graphics rendering, including events such as VSYNC and hotplug for plug-and-play HDMI support. A display kernel driver 1104 may contain low-level hardware-specific instructions to operating the underlying hardware, further discussed below.

As discussed above, a dim layer may partially obstruct and conceal the remaining layers underneath. Thus, the remaining layers are not clearly visible to the user. There is an opportunity to reduce power consumption and memory bandwidth at the cost of visual quality, as the user is less likely to notice lower visual quality in the remaining layers since they are partially blocked by the dim layer.

In one example, a GPU 1106 may render remaining layers below the dim layer at a low resolution for later upconversion. Furthermore, the lower resolution can be selected based on the dim layer's alpha value. For example, a dim layer exceeding a first opaqueness threshold is an opportunity for the GPU 1106 to render the remaining layers at a lower resolution, increasing the resource savings. Further savings can be achieved by further decreasing resolution if the dim layer exceeds a second opaqueness threshold higher than the first opaqueness threshold. The GPU 1106 may utilize a video scaler to convert the remaining layers from a first or regulation resolution to the low resolution. This process may be appreciated by those skilled in the art as "downconversion" or "downscaling."

In another example, the GPU 1106 may compress the remaining layers. For example, the remaining layers below the dim layer may be compressed after being rendered by the GPU 1106 but before being transferred to memory. Furthermore, a compression factor can be selected based on the dim layer's alpha value. For example, a more opaque dim layer is an opportunity for the GPU 1106 to utilize a higher compression factor, increasing the resource savings.

A memory 1108 may be DDR memory or other computer-readable memory and be configured to store the layers. When ready, a display pipeline 1110 may retrieve the stored layers for further processing. The layers may include a top layer, a dim layer, and remaining layers which were modified as discussed to reduce resource consumption. The display pipeline 1110 may conduct further processing as necessary. For example, if the remaining layers downconverted above, they will now be upconverted or upscaled to the correct or regular resolution for display. Furthermore, if the remaining layers were compressed, the display pipeline 1110 decompresses them.

The layers are provided to a layer composition module 1112 to be composited into a final frame for communication to a DSI interface 1114 and display to the user. The DSI interface may be in communication with a video mode display panel.

It will be appreciated that bandwidth and power consumption by the GPU 1106 or display pipeline 1110 during the layer fetch from DDR memory is proportional to: width and height of incoming layer, format/bits per pixel of the layer, and frames-per-second of the layer. Thus, if layer are fetched in low resolution or compressed states, then power consumption and memory bandwidth can be reduced considerably.

Figure 12:
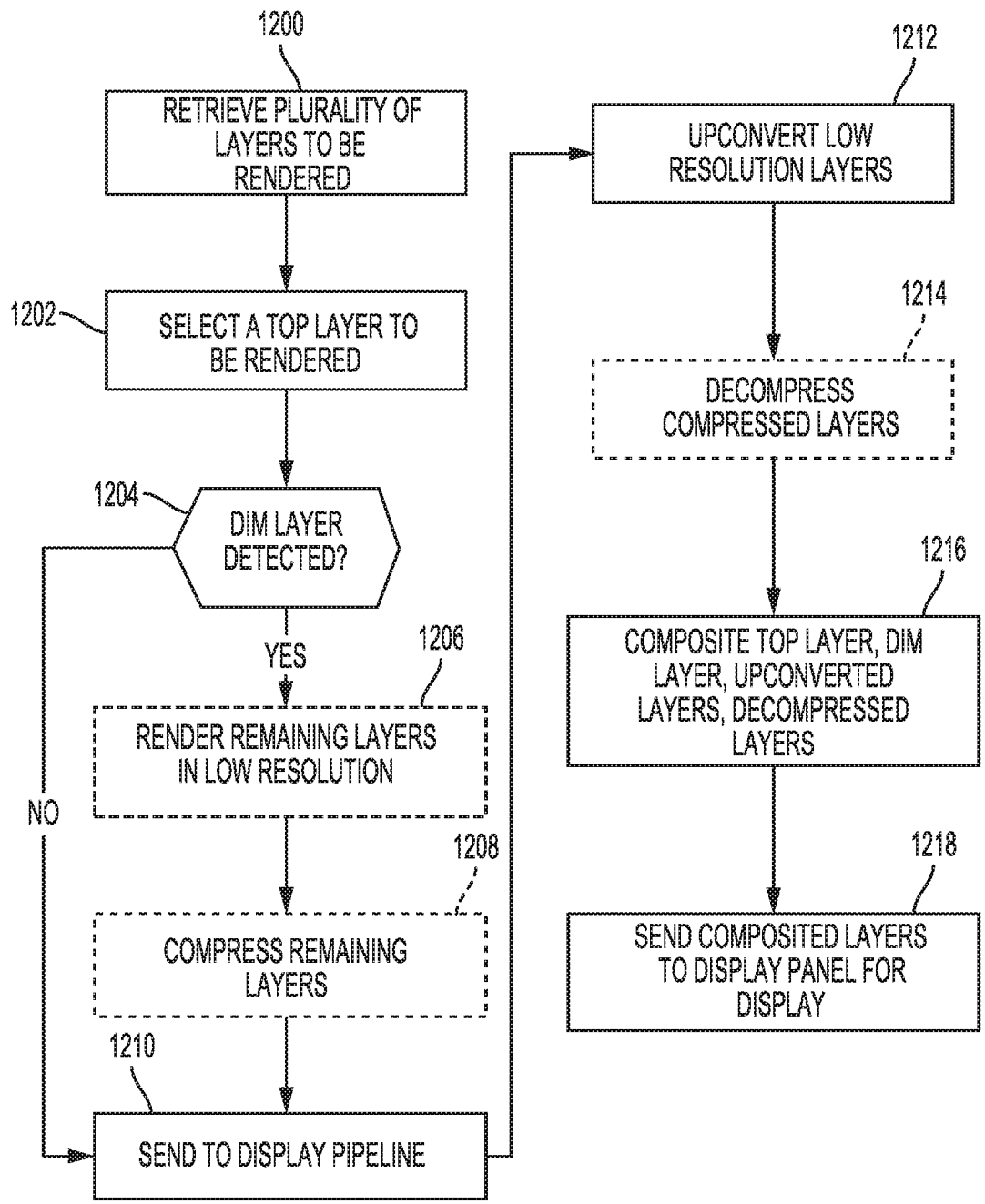
FIG. 12 is a flowchart illustrating an example method according to one or more example techniques described in this disclosure.

FIG. 12 is a flowchart illustrating an example process according to one or more example techniques described in this disclosure. The process may execute on systems and apparatuses as illustrated above. The process may produce screenshots as illustrated above. The process may embody the concepts and improvements discussed herein.

In 1200, a GPU may retrieve a plurality of layers from a memory to be rendered. For example, the layers may be generated from user applications executing on a smartphone, or from other sources discussed herein. In one embodiment, the memory may be DDR memory in communication with the GPU.

In 1202, the GPU may select a top layer to be rendered. For example, the top layer may be displayed on top of all other layers. For example, the top layer may be a pop-up UI layer or a pop-up notification layer. For example, the top layer may be rendered in a regular resolution in the operation of the display system.

In 1204, the GPU may determine whether there exists a dim layer within or among the plurality of layers that may partially obstruct or otherwise conceal remaining layers underneath the dim layer. As discussed above, a dim layer may provide opportunities for resource savings when rendering and transferring the remaining layers. For example, a dim layer may be detected by determining its color (for example, black) and its alpha value exceeding a first opaqueness threshold.

If the dim layer exists, the process may proceed to 1206. If not, the process may proceed to 1210.

In 1206, the GPU may optionally render the remaining layers in low resolution. As discussed, remaining layers underneath the dim layer are less observable to the user, and thus less likely to impact visual quality if rendered in low resolution. In one embodiment, the resolution may be selected based on an opaqueness of the dim layer. The more opaque the dim layer (the higher its alpha value), the lower resolution may be selected. As discussed above, a lower resolution may be selected if the dim layer alpha value exceeds a second threshold. That is, the low resolution may be further lowered.

In 1208, the GPU may optionally compress the remaining layers. As discussed, there is an opportunity to reduce bandwidth requirement by compressing the remaining layers underneath the dim layer as they are less observable to the user. In one embodiment, a compression may be selected based on an opaqueness of the dim layer. The more opaque the dim layer (the higher its alpha value), the higher compression factor may be selected. For example, a higher compression factor may be selected if the dim layer alpha value exceeds a second threshold. That is, the compression factor may be increased.

In one example, the low resolution and the compression factor may be selected to help the display pipeline meet a power consumption or a memory bandwidth constraint.

In 1210, the GPU may send the plurality of rendered layers to the display pipeline.

In 1212, the display pipeline may upconvert low resolution layers.

In 1214, the display pipeline may optionally decompress the compressed layers, if layers were compressed above in 1208.

In 1216, the display pipeline may composite the top layer, dim layer, upconverted layers, and decompressed layers (if any) for display. For example, the display pipeline may composite the components into a frame.

In 1218, the display pipeline may send the composited layers to a display panel for display to a user. For example, the display pipeline may communicate the composited layers to a DSI interface in communication with a video mode display panel for display to a user.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for displaying data, the apparatus comprising:
   a memory, the memory storing a plurality of layers to be rendered for display;
   a GPU in communication with the memory, the GPU configured to,
   retrieve the plurality of layers to be rendered,
   render a first layer from the plurality of layers,
   responsive to determining a second layer is disposed below a dim layer, rendering the second layer differently than the first layer in at least one of a resolution or compression ratio, wherein the resolution or compression ratio of the second layer is selected in view of a power consumption or memory bandwidth constraint; and
   a display pipeline in communication with the GPU, the display pipeline configured to upconvert or decompress the second layer before display.

2. The apparatus of claim 1, wherein the dim layer is detected based on a comparison of an alpha value of the dim layer and a first opaqueness threshold.

3. The apparatus of claim 1, wherein the first layer is rendered at a first resolution and the second layer is rendered at a second resolution, wherein the second resolution lower than the first resolution.

4. The apparatus of claim 3, wherein the second resolution is a first value if the dim layer alpha value exceeds a first opaqueness threshold and the second resolution is a second value if the dim layer alpha value exceeds a second opaqueness threshold, wherein the second opaqueness threshold is higher than the first opaqueness threshold and wherein the second value is less than the first value.

5. The apparatus of claim 1, wherein the first layer is rendered at a first compression ratio and the second layer is rendered at a second compression ratio, wherein the second compression ratio is higher than the first compression ratio.

6. The apparatus of claim 5, wherein the second compression ratio is a first value if the dim layer alpha value exceeds a first opaqueness threshold and the second compression value is a second value if the dim layer alpha value exceeds a second opaqueness threshold, wherein the second opaqueness threshold is higher than the first opaqueness threshold and wherein the second value is more than the first value.

7. The apparatus of claim 1, wherein the display pipeline composites the rendered first layer, the dim layer, and the second layer for display.

8. An apparatus for displaying data, the apparatus comprising:
   a means for storing a plurality of layers to be rendered for display;
   a means for processing in communication with the means for storing, the means for processing configured to,
   retrieve the plurality of layers to be rendered,
   render a first layer from the plurality of layers,
   responsive to determining a second layer is disposed below a dim layer, render the second layer differently than the first layer in at least one of a resolution or compression ratio, wherein the resolution or compression ratio of the second layer is selected in view of a power consumption or memory bandwidth constraint; and
   a means for displaying in communication with the means for processing, the means for displaying configured to upconvert or decompress the second layer before display.

9. The apparatus of claim 8, wherein the dim layer is detected based on a comparison of an alpha value of the dim layer and a first opaqueness threshold.

10. The apparatus of claim 8, wherein the first layer is rendered at a first resolution and the second layer is rendered at a second resolution, wherein the second resolution lower than the first resolution.

11. The apparatus of claim 10, wherein the second resolution is a first value if the dim layer alpha value exceeds a first opaqueness threshold and the second resolution is a second value if the dim layer alpha value exceeds a second opaqueness threshold, wherein the second opaqueness threshold is higher than the first opaqueness threshold and wherein the second value is less than the first value.

12. The apparatus of claim 8, wherein the first layer is rendered at a first compression ratio and the second layer is rendered at a second compression ratio, wherein the second compression ratio is higher than the first compression ratio.

13. The apparatus of claim 12, wherein the second compression ratio is a first value if the dim layer alpha value exceeds a first opaqueness threshold and the second compression value is a second value if the dim layer alpha value exceeds a second opaqueness threshold, wherein the second opaqueness threshold is higher than the first opaqueness threshold and wherein the second value is more than the first value.

14. The apparatus of claim 8, wherein the display pipeline means composites the rendered first layer, the dim layer, and the second layer for display.

15. A method for displaying data, the method comprising:
retrieving a plurality of layers from a memory to be rendered;
rendering a first layer from the plurality of layers;
responsive to determining a second layer is disposed below a dim layer, rendering the second layer differently than the first layer in at least one of a resolution or compression ratio, wherein the resolution or compression ratio of the second layer is selected in view of a power consumption or memory bandwidth constraint; and
upconverting or decompressing the second layer before display.

16. The method of claim 15, wherein the dim layer is detected based on a comparison of an alpha value of the dim layer and a first opaqueness threshold.

17. The method of claim 15, wherein the first layer is rendered at a first resolution and the second layer is rendered at a second resolution, wherein the second resolution lower than the first resolution.

18. The method of claim 17, wherein the second resolution is a first value if the dim layer alpha value exceeds a first opaqueness threshold and the second resolution is a second value if the dim layer alpha value exceeds a second threshold, wherein the second opaqueness threshold is higher than the first opaqueness threshold and wherein the second value is less than the first value.

19. The method of claim 15, wherein the first layer is rendered at a first compression ratio and the second layer is rendered at a second compression ratio, wherein the second compression ratio is higher than the first compression ratio.

20. The method of claim 19, wherein the second compression ratio is a first value if the dim layer alpha value exceeds a first opaqueness threshold and the second compression value is a second value if the dim layer alpha value exceeds a second opaqueness threshold, wherein the second opaqueness threshold is higher than the first opaqueness threshold and wherein the second value is more than the first value.

21. The method of claim 15, wherein the rendered first layer, the dim layer, and the second layer are composited for display.

22. A non-transitory computer-readable storage medium storing instructions that, when executed, cause one or more processors of a device for processing data to:
retrieve a plurality of layers from a memory to be rendered;
render a first layer from the plurality of layers;
responsive to determining a second layer is disposed below a dim layer, render the second layer differently than the first layer in at least one of a resolution or compression ratio wherein the resolution or compression ratio of the second layer is selected in view of a power consumption or memory bandwidth constraint; and
upconvert or decompress the second layer before display.

23. The computer-readable storage medium of claim 22, wherein the dim layer is detected based on a comparison of an alpha value of the dim layer and a first opaqueness threshold.

24. The computer-readable storage medium of claim 22, wherein the first layer is rendered at a first resolution and the second layer is rendered at a second resolution, wherein the second resolution lower than the first resolution.

25. The computer-readable storage medium of claim 24, wherein the second resolution is a first value if the dim layer alpha value exceeds a first opaqueness threshold and the second resolution is a second value if the dim layer alpha value exceeds a second opaqueness threshold, wherein the second opaqueness threshold is higher than the first opaqueness threshold and wherein the second value is less than the first value.

26. The computer-readable storage medium of claim 24, wherein the second compression ratio is a first value if the dim layer alpha value exceeds a first opaqueness threshold and the second compression value is a second value if the dim layer alpha value exceeds a second opaqueness threshold, wherein the second opaqueness threshold is higher than the first opaqueness threshold and wherein the second value is more than the first value.

27. The computer-readable storage medium of claim 22, wherein the first layer is rendered at a first compression ratio and the second layer is rendered at a second compression ratio, wherein the second compression ratio is higher than the first compression ratio.

\* \* \* \* \*